United States Patent
Engstrand

(10) Patent No.: US 8,515,709 B2
(45) Date of Patent: Aug. 20, 2013

(54) PORTABLE DEVICE, SYSTEM AND METHOD FOR MEASURING A VOLUME OF A VESSEL USING AN LED

(75) Inventor: Bradley W. Engstrand, Hartford, WI (US)

(73) Assignee: Phaedrus, LLC, Hartford, WI (US)

( * ) Notice: Subject to any disclaimer, the term of this patent is extended or adjusted under 35 U.S.C. 154(b) by 445 days.

(21) Appl. No.: 12/928,176

(22) Filed: Dec. 6, 2010

(65) Prior Publication Data

US 2012/0143530 A1  Jun. 7, 2012

(51) Int. Cl.
*G01B 5/26* (2006.01)

(52) U.S. Cl.
USPC .......................................... 702/156

(58) Field of Classification Search
USPC .............................. 702/155–158, 45, 182–185
See application file for complete search history.

(56) References Cited

U.S. PATENT DOCUMENTS

| | | | |
|---|---|---|---|
| 4,661,695 A | 4/1987 | Mori et al. |
| 4,777,359 A | 10/1988 | Havel |
| 4,811,561 A | 3/1989 | Edwards et al. |
| 4,902,903 A | 2/1990 | Segerson et al. |
| 4,962,395 A | 10/1990 | Baird |
| 5,058,420 A | 10/1991 | Vali et al. |
| 5,184,009 A | 2/1993 | Wright et al. |
| 5,684,246 A | 11/1997 | Korpi |
| 5,988,676 A | 11/1999 | Lotito |
| 5,990,990 A | 11/1999 | Crabtree |
| 6,115,168 A | 9/2000 | Zhao et al. |
| 6,180,955 B1 | 1/2001 | Doggett et al. |
| 6,484,620 B2 | 11/2002 | Arshad et al. |
| 6,600,144 B2 | 7/2003 | Matthies |
| 6,611,318 B2 | 8/2003 | LaPolice |
| 6,952,009 B1 | 10/2005 | Engstrand |
| 7,157,294 B2 | 1/2007 | Uemura et al. |
| 7,180,053 B2 | 2/2007 | Engstrand |
| 7,291,830 B1 | 11/2007 | Engstrand |
| 7,294,823 B2 | 11/2007 | Engstrand |
| 7,348,542 B2 | 3/2008 | Engstrand |
| 7,388,188 B2 | 6/2008 | Engstrand |
| 7,456,385 B2 | 11/2008 | Engstrand |
| 7,468,522 B2 | 12/2008 | Engstrand |
| 7,476,842 B2 | 1/2009 | Engstrand |
| 7,518,100 B2 | 4/2009 | Engstrand |
| 7,626,153 B2 | 12/2009 | Engstrand |
| 7,703,279 B2 | 4/2010 | Engstrand |

(Continued)

OTHER PUBLICATIONS

PCT Search Report, Mar. 28, 2012, ISA.

(Continued)

*Primary Examiner* — Edward Raymond
(74) *Attorney, Agent, or Firm* — Patents + TMS, P.C.

(57) ABSTRACT

A portable device, a system and a method measure a volume of a vessel, such as, for example, an expandable bag and/or a pressurized vessel, using a light-emitting diode (LED) located within the portable device. A shaft which may extend from the portable device may be introduced into the vessel. The light emitted by the LED may travel through the shaft into the vessel, and light reflected by the interior of the vessel may travel through the shaft into the portable device. The shaft may be introduced into a container in which at least a portion of the vessel is located. The light emitted by the LED may travel through the shaft into the container, and light reflected by the interior of the container and/or the exterior of the vessel may travel through the shaft into the portable device.

19 Claims, 3 Drawing Sheets

(56) References Cited

U.S. PATENT DOCUMENTS

| | | |
|---|---|---|
| 2002/0054290 A1* | 5/2002 | Vurens et al. .................. 356/369 |
| 2002/0089669 A1 | 7/2002 | Liu et al. |
| 2002/0168153 A1 | 11/2002 | Yamabayashi et al. |
| 2003/0043107 A1 | 3/2003 | Ruby et al. |
| 2004/0165183 A1 | 8/2004 | Marquardt et al. |
| 2007/0115686 A1 | 5/2007 | Tyberghien |
| 2008/0079955 A1* | 4/2008 | Storm ........................... 356/627 |
| 2008/0236275 A1* | 10/2008 | Breed et al. .................. 73/290 V |
| 2009/0076329 A1* | 3/2009 | Su et al. ........................ 600/134 |
| 2009/0324175 A1 | 12/2009 | Everett et al. |

OTHER PUBLICATIONS

PCT Written Opinion, Mar. 28, 2012, ISA.

\* cited by examiner

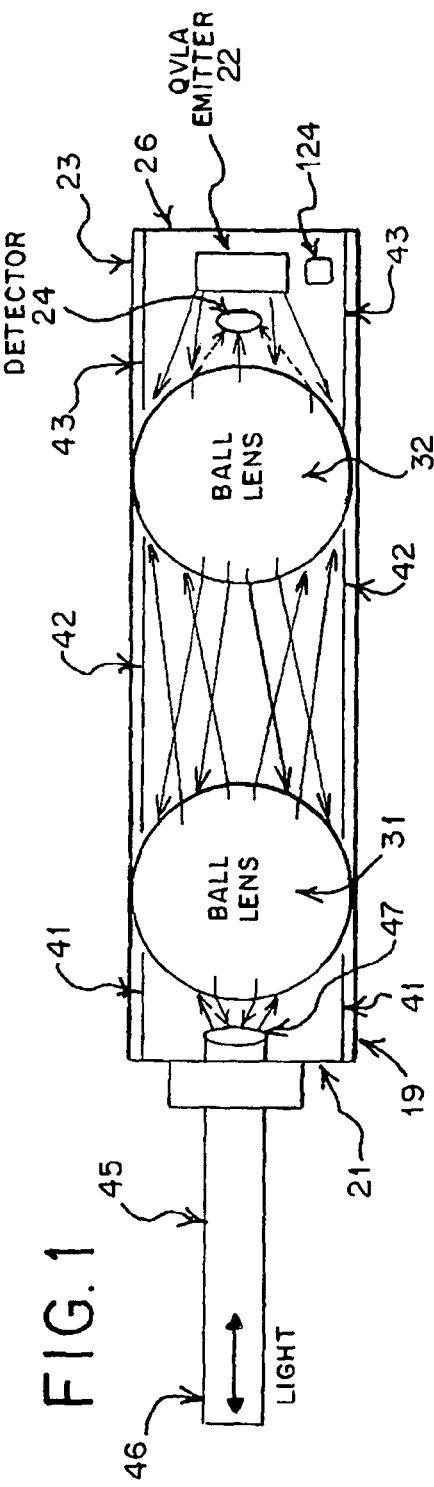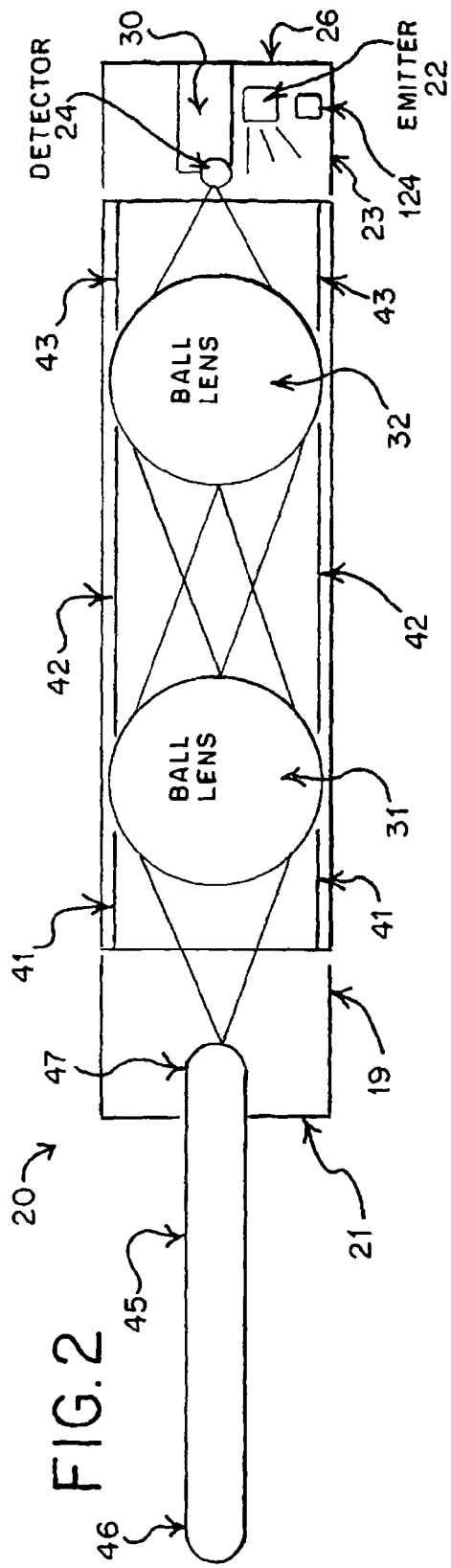

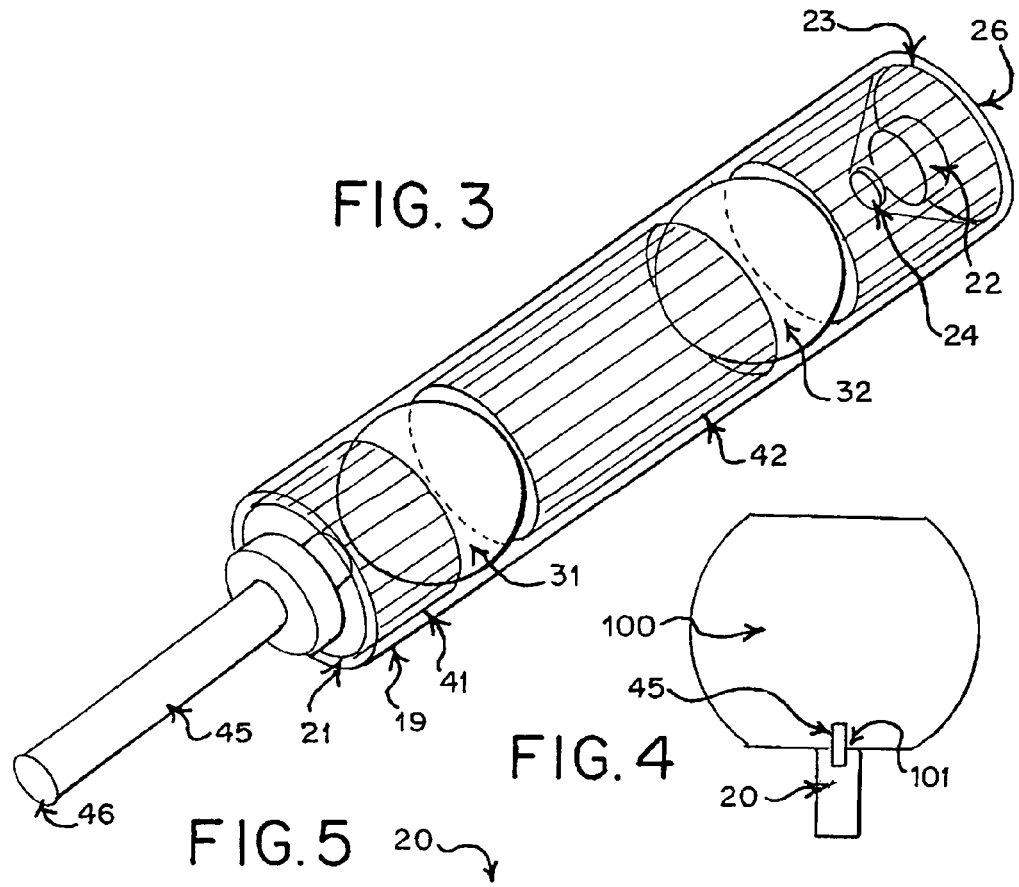
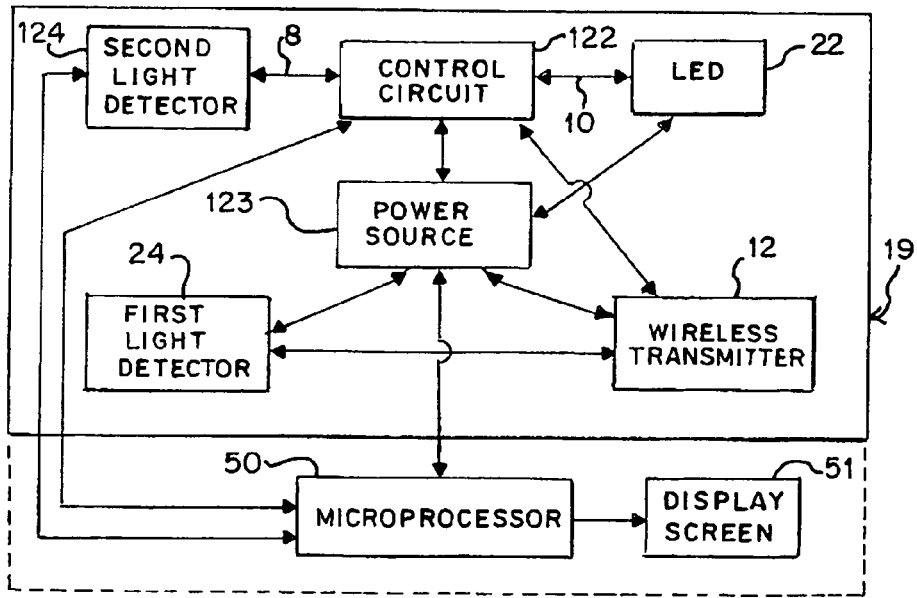

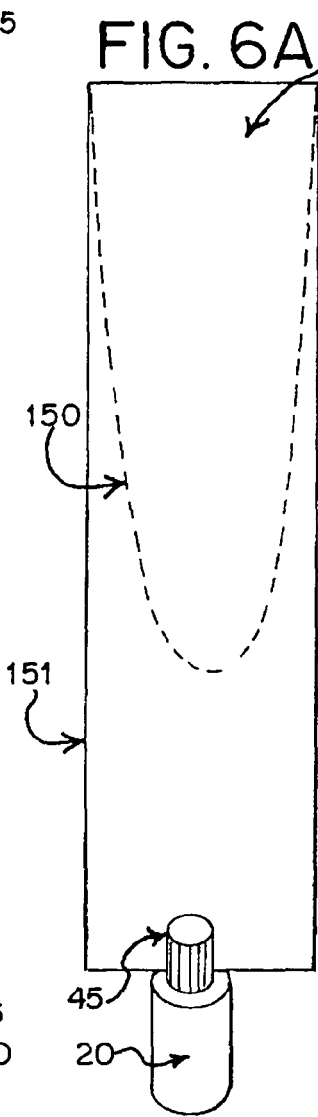
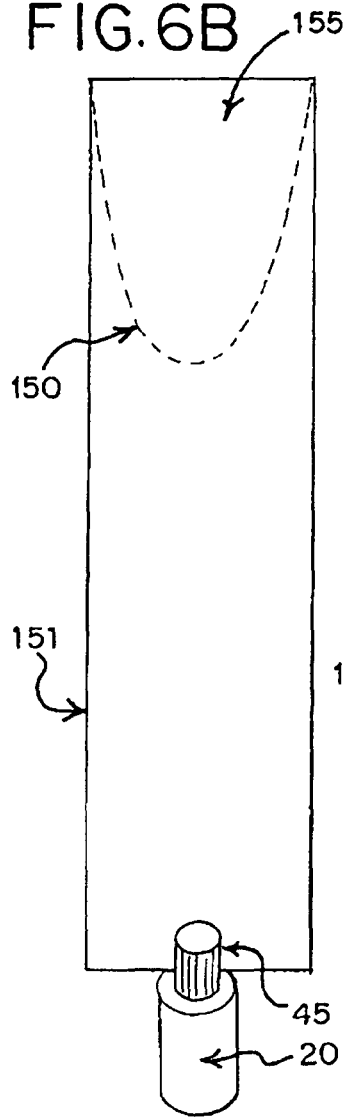
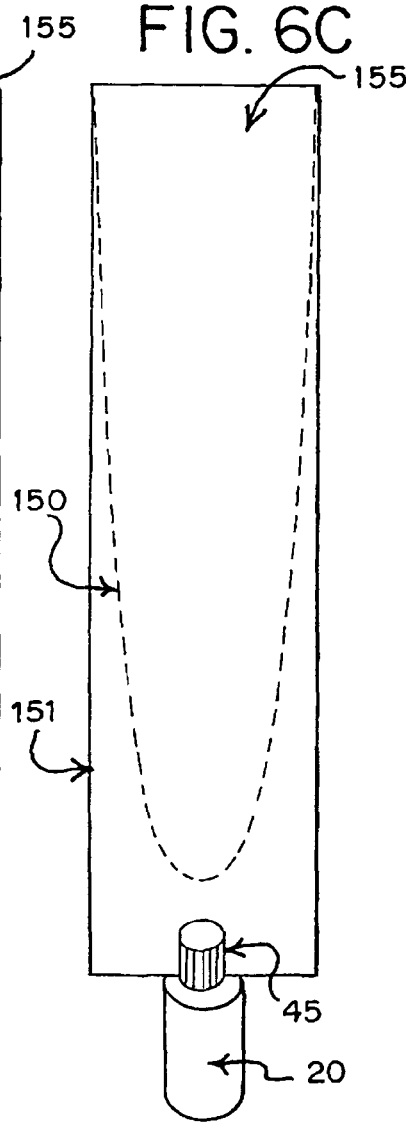
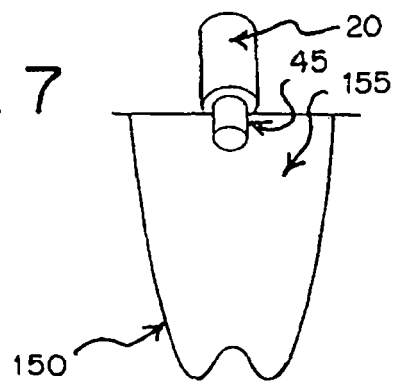

PORTABLE DEVICE, SYSTEM AND METHOD FOR MEASURING A VOLUME OF A VESSEL USING AN LED

BACKGROUND OF THE INVENTION

The present invention generally relates to a portable device, a system and a method for measuring a volume using a light-emitting diode (LED). More specifically, the present invention relates to a portable device which houses the LED and measures the volume of a vessel, such as, for example, an expandable bag and/or a pressurized vessel.

Welding tanks, medical oxygen tanks, scuba tanks, fire extinguishers and soda machine $CO_2$ tanks are examples of pressurized vessels. Currently, all critical high pressure vessels within the United States are tested for leaks or flaws on a cyclical schedule as mandated by the Department of Transportation. Hydrostatic tank testing typically involves pressurizing the vessel to 3,000 psi. Then, the vessel is immersed in water, pressurized to 5,000 psi, and studied for leaks or flaws. If the vessel expands beyond 10% of its volume, the vessel fails the test.

In addition, there are several devices known as accumulators. Accumulators are used extensively in the fluid power industry, with well water, with pressure piping distribution and in other environments where a reservoir or standby pressure is needed. These devices typically have a collapsable bag within another container, sometimes under pressure. The volume of the collapsable bag must be monitored to ensure effective use of the accumulator.

Hydrostatic testing has numerous problems. For example, hydrostatic testing is unsafe. If a vessel explodes, individuals performing the hydrostatic testing may be injured or killed. Further, hydrostatic testing uses large quantities of clean water. The water must be clean because contaminants fill micro-holes in the vessel which may lead to the vessel erroneously passing the test, may widen pre-existing cracks in the vessel, and may adversely interact with vessel contents. Still further, the vessel must be completely cleaned and dried after the test. Any material which remains in the vessel after the test may react with contents added to the tank. Yet further, hydrostatic testing is time-consuming and labor intensive. More specifically, loading the vessel, attaching high pressure fittings, and cleaning and drying the vessel is time-consuming and labor intensive. Moreover, hydrostatic testing requires various pieces of equipment, such as testing chambers, hydraulic pumps and expensive gauges.

Further, hydrostatic testing uses large amounts of energy. The hydraulic pumps are expensive to operate, and the water used to flush the vessel after testing is typically heated. Still further, hydrostatic testing has temperature constraints. More specifically, hydrostatic testing must be performed at temperatures above freezing. Yet further, hydrostatic testing requires that vessels are moved to the testing site. Moreover, hydrostatic testing is typically ineffective with composite vessels. Composite vessels have two or more layers, namely a polypropylene inner layer with an external rigid layer, and water migrates between the two layers during testing to cause the vessel to fail the test.

A need, therefore, exists for a portable device which measures a volume. In addition, a need exists for a system and a method for measuring a volume which are safe, accurate and inexpensive and which are not time-consuming and labor intensive.

SUMMARY OF THE INVENTION

The present invention generally relates to a portable device, a system and a method for measuring a volume of a vessel, such as, for example, an expandable bag and/or a pressurized vessel, using a light-emitting diode (LED). More specifically, the present invention relates to a portable device which houses the LED and measures the volume of the vessel. The portable device may measure the volume by reading and/or measuring an intensity of light emitted from the portable device into the vessel and reflected by the interior of the vessel into the portable device. The portable device and/or the vessel may be located in a container, and/or the portable device may measure the volume by reading and/or measuring an intensity of light emitted from the portable device into the container and reflected by the interior of the container and/or the exterior of the vessel into the portable device.

A shaft may extend from within the portable device to a point outside of the portable device. The shaft may be introduced into the vessel and/or the container. The light emitted by the LED may travel through the shaft into the vessel and/or the container. Light reflected within the vessel and/or the container may travel through the shaft into the portable device. A light detector located within the portable device may read and/or may measure the intensity of the light traveling into the portable device to determine the volume of the vessel.

To this end, in an embodiment of the present invention, a portable device for measuring a volume of a vessel is provided. The portable device has a housing having a first end and a second end wherein the second end is located in a position opposite to the first end; an LED that emits light wherein the LED is located within the housing at the second end of the housing; a shaft extending from the first end of the housing wherein the shaft has a first end located outside of the housing and a second end located inside of the housing and further wherein the shaft is made of a material which conveys the light emitted from the LED from a position within the housing to a position outside of the housing wherein the shaft conveys reflected light into the housing; a first light detector located within the housing at the second end of the housing; a first lens located within the housing between the first light detector and the second end of the shaft wherein the first lens focuses the light emitted from the LED onto the second end of the shaft and further wherein the first lens focuses the reflected light conveyed by the shaft onto the first light detector wherein the first light detector measures an intensity of the reflected light conveyed by the shaft; and a microprocessor which receives a signal from the first light detector indicative of the intensity of the reflected light wherein the microprocessor uses the signal to determine the volume of the vessel.

In an embodiment, the portable device has a second lens located within the housing between the first lens and the LED.

In an embodiment, the portable device has a second light detector located within the housing at a position adjacent to the LED wherein the second light detector measures an intensity of the light emitted from the LED.

In an embodiment, the shaft has a cylindrical shape.

In an embodiment, the first lens is a ball lens having a spherical shape.

In an embodiment, the portable device has a cylinder located between the first lens and the first end of the housing wherein the cylinder maintains a position of the first lens relative to the housing.

In an embodiment, the portable device has a display screen mechanically connected to the portable device wherein the display screen displays at least one of the reflected light conveyed by the shaft and the volume of the vessel.

In an embodiment, the portable device has a platform located at the second end of the housing wherein the LED is connected to the platform, and the first light detector is connected to a member which extends from the platform.

In an embodiment, the first light detector is located between the LED and the first lens.

In an embodiment, the microprocessor is mechanically connected to the housing.

In another embodiment of the present invention, a system for measuring a volume of a vessel having an interior is provided. The system has a portable device; an LED that emits light wherein the LED is located within the portable device; a shaft extending from the portable device wherein the shaft has a first end located outside of the portable device and a second end located within the portable device and further wherein the first end of the shaft inserts into the vessel to convey the light emitted from the LED into the vessel wherein the shaft conveys the light reflected by the interior of the vessel into the portable device; and a light detector located within the portable device wherein the first light detector is located between the shaft and the LED and further wherein the first light detector measures an intensity of the light reflected by the interior of the vessel into the portable device.

In an embodiment, the system has a lens which focuses the light emitted from the LED onto the first end of the shaft wherein the lens focuses the light reflected by the vessel into the portable device onto the light detector and further wherein the lens is located between the light detector and the first end of the shaft.

In an embodiment, the system has a wireless transmitter connected to the portable device wherein the wireless transmitter transmits a signal from the light detector to a microprocessor located remote from the portable device and further wherein the signal is indicative of the intensity of the light reflected by the vessel into the portable device wherein the microprocessor uses the signal to determine the volume of the vessel.

In an embodiment, the shaft is made of one of plastic and glass.

In another embodiment of the present invention, a method for measuring the volume of a vessel is provided. The method has the steps of emitting light from an LED into a container in which a vessel is located wherein the LED is located outside of the vessel and further wherein the vessel has an interior and an exterior; obtaining measurements of an intensity of the light emitted from the LED into the container and reflected by at least one of the container and the exterior of the vessel; transmitting a signal indicative of the measurements to a microprocessor; and determining the volume of the vessel wherein the microprocessor uses the signal to determine the measurements.

In an embodiment, the method has the step of introducing one of a gas and a fluid into the vessel wherein the measurements are continuously obtained during introduction of the one of the gas and the fluid into the vessel.

In an embodiment, the method has the step of focusing the light emitted from the LED into the container wherein a lens located between the LED and the container focuses the light.

In an embodiment, the method has the step of generating a response message if the volume of the vessel matches a predetermined threshold value wherein the microprocessor generates the response message.

In an embodiment, the method has the step of conveying the light emitted from the LED into the container wherein the light is conveyed by a shaft extending from a portable device which houses the LED and further wherein the shaft conveys the light reflected by at least one of the container and the exterior of the vessel into the portable device wherein a light detector located within the portable device obtains the measurements.

It is, therefore, an advantage of the present invention to provide a portable device, a system and a method for measuring a volume of a vessel using a LED.

Another advantage of the present invention is to provide a portable device, a system and a method for measuring a volume of a vessel using a LED which are safer than hydrostatic testing.

And, another advantage of the present invention is to provide a portable device, a system and a method for measuring a volume of a vessel using a LED which are portable.

Yet another advantage of the present invention is to provide a portable device, a system and a method for measuring a volume of a vessel using a LED which do not use water.

And, another advantage of the present invention is to provide a portable device, a system and a method for measuring a volume of a vessel using a LED which do not require drying the vessel.

Yet another advantage of the present invention is to provide a portable device, a system and a method for measuring a volume of a vessel using a LED which require less equipment than hydrostatic testing.

Another advantage of the present invention is to provide a portable device, a system and a method for measuring a volume of a vessel using a LED which may be used at any temperature.

Yet another advantage of the present invention is to provide a portable device, a system and a method for measuring a volume of a vessel using a LED which may be used to test composite pressurized vessels.

A still further advantage of the present invention is to provide a portable device, a system and a method for measuring a volume of a vessel using a LED which require less energy than hydrostatic testing.

Moreover, an advantage of the present invention is to provide a portable device, a system and a method for measuring a volume of a vessel using a LED which are less time-consuming and labor-intensive than hydrostatic testing.

And, another advantage of the present invention is to provide a portable device, a system and a method for measuring a volume of a vessel using a LED which provide continuous real-time measurements.

Yet another advantage of the present invention is to provide a portable device, a system and a method for measuring a volume of a vessel using a LED that generate a response based on real-time measurements and a predetermined threshold value.

Moreover, an advantage of the present invention is to provide a portable device, a system and a method for measuring a volume of a vessel using a LED which may be used while the vessel has contents and/or while the contents of the vessel are being used.

And, another advantage of the present invention is to provide a portable device, a system and a method for measuring a volume of a vessel which emit light into the interior of the vessel.

Yet another advantage of the present invention is to provide a portable device, a system and a method for measuring a volume of a vessel which emit light into the interior of a container holding the vessel and measure the light reflected by the interior of the container and/or the exterior of the vessel.

Moreover, an advantage of the present invention is to provide a portable device, a system and a method for measuring a volume of a vessel which may have applications for welding tanks, medical oxygen tanks, scuba tanks, fire extinguishers, soda machine $CO_2$ tanks and/or the like.

Additional features and advantages of the present invention are described in, and will be apparent from, the detailed description of the presently preferred embodiments and from the drawings.

BRIEF DESCRIPTION OF THE DRAWINGS

FIGS. 1 and 2 illustrate side views of embodiments of a portable device for measuring a volume of a vessel.

FIG. 3 illustrate a perspective view of an embodiment of a portable device for measuring a volume of a vessel.

FIG. 4 illustrates a side view of a pressurized vessel with a portable device for measuring a volume of the pressurized vessel in an embodiment of the present invention.

FIG. 5 illustrates a box diagram of an embodiment of a portable device for measuring a volume of a vessel.

FIGS. 6A, 6B and 6C illustrate side views of a bag, a container and a portable device for measuring the volume of the bag in embodiments of the present invention.

FIG. 7 illustrates a side view of a bag and a portable device for measuring the volume of the bag in an embodiment of the present invention.

DETAILED DESCRIPTION OF THE PRESENTLY PREFERRED EMBODIMENTS

The present invention generally relates to a portable device, a system and a method for measuring a volume of a vessel, such as, for example, an expandable bag and/or a pressurized vessel, using a light-emitting diode (LED). More specifically, the present invention relates to a portable device which houses the LED and measures the volume of the vessel. The portable device may measure the volume by reading and/or measuring an intensity of light emitted from the portable device into the vessel and reflected by the interior of the vessel into the portable device. The portable device and/or the vessel may be located in a container, and/or the portable device may measure the volume by reading and/or measuring an intensity of light emitted from the portable device into the container and reflected by the interior of the container and/or the exterior of the vessel into the portable device.

A shaft of solid optic material may extend from within the portable device to a point outside of the portable device. The portable device may have a first lens and/or a second lens which may be located between the solid optic material and the LED, and the first lens and/or the second lens may focus the light emitted from the LED onto the shaft of solid optic material. The shaft of solid optic material may be introduced into the vessel and/or the container. The light emitted by the LED may travel through the shaft of solid optic material into the vessel and/or the container. Light reflected within the vessel and/or the container may travel through the shaft of solid optic material into the portable device, and the first lens and/or the second lens may focus the light onto a light detector located within the portable device. The light detector may read and/or may measure the intensity of the light entering the portable device to determine the volume of the vessel. Gas and/or fluid may be introduced into the vessel, and the portable device may determine the volume of the vessel as the gas and/or the fluid is introduced.

Referring now to the drawings wherein like numerals refer to like parts, FIGS. 1, 2 and 3 generally illustrates a portable device 20 for measuring a volume in embodiments of the present invention. The portable device 20 may have a housing 19. The housing 19 may have a first end 21 and/or a second end 23 which may be located in a position opposite to the first end 21. The portable device 20 may have an LED 22 which may be located at the second end 23 of the portable device 20 and/or within the housing 19. The LED 22 may emit one or more colors of light, for example, blue light, red light, green light, white light and/or the like. The LED 22 may emit one or more types of light, such as, for example, infrared light, visible light, ultraviolet light and/or the like. The present invention is limited to a specific embodiment of the LED 22. The LED 22 may be any light source known to one having ordinary skill in the art.

The LED 22 may have a finish (not shown) which may prevent and/or reduce reflection of ambient light from the LED 22 and/or may allow the light emitted from the LED 22 to pass through the finish. The finish may be produced by mechanically abrading and/or chemically altering the LED 22. In an embodiment, the finish may be a coating, such as, for example, one or more filters and/or chemicals placed over the LED 22.

The portable device 20 may have a platform 26 for securing the LED 22 and/or one or more other components of the portable device 20. The platform 26 may be a component of and/or may be mechanically connected to the housing 19. The platform 26 may be, for example, a printed circuit board, a plastic surface, a metal surface and/or the like. The platform 26 may be any surface capable of maintaining a position of the LED 22 relative to the housing 19. The present invention is not limited to a specific embodiment of the platform 26.

The portable device 20 may have a first lens 31 and/or a second lens 32 which may be located within the housing 19. The second lens 32 may be located between the first lens 31 and the LED 22. The first lens 31 and/or the second lens 32 may be, for example, a spherical ball lens, a fiber coupling sphere, a collimating lens and/or the like. Further, the first lens 31 and/or the second lens 32 may have a cross-sectional shape of, for example, a circle, an oval and/or the like. The first lens 31 and/or the second lens 32 may be made from any material. In an embodiment, the first lens 31 and/or the second lens 32 may be made from glass.

In an embodiment, the portable device 20 may have a first cylinder 41, a second cylinder 42 and/or a third cylinder 43 which may be located within the housing 19. The first cylinder 41, the second cylinder 42 and/or the third cylinder 43 may support the first lens 31 and/or the second lens 32. The first cylinder 41, the second cylinder 42 and/or the third cylinder 43 may maintain positions of the first lens 31 and/or the second lens 32 within the portable device 20. The first cylinder 41 may be located between the first end 21 of the portable device 20 and the first lens 31. The second cylinder 42 may be located between the first lens 31 and the second lens 32. The third cylinder 43 may be located between the second lens 32 and the second end 22 of the portable device 20. For example, the third cylinder 43 may be located between the second lens 32 and the platform 26.

The portable device 20 may have a shaft 45 which may extend from the portable device 20 and/or into the portable device 20. For example, the shaft 45 may extend through the first end 21 of the housing 19. The shaft 45 may have a first end 46 which may be located outside of the portable device 20 and/or may have a second end 47 which may be located inside of the portable device 20. The first end 21 of the housing 19 may be located between the first end 46 of the shaft 45 and the second end 47 of the shaft 45. The shaft 45 may be made from any material. In an embodiment, the shaft 45 may be made from solid optic material, such as, for example, plastic and/or glass. The first lens 31 and/or the second lens 32 may focus the light emitted from the LED 22 onto the second end 47 of the shaft 45. For example, the first lens 31 and/or the second lens 32 may focus the light emitted from the LED 22 to a focus point which may be located at the second end 47 of the shaft 45.

As shown in FIG. 4, the shaft 45 may be introduced into a pressurized vessel 100 so that the light emitted from the LED 22 may travel through the shaft 45 into the pressurized vessel 100. Light reflected by the pressurized vessel 100 may travel through the shaft 45 to enter the portable device 20. The portable device 20 may have a light detector 24 which may be, for example, a light intensity detector, a photodiode, a phototransistor and/or other like detector that may output a signal as a function of light intensity detected. In an embodiment, the signal may be a current and/or a voltage. The present invention is not limited to a specific embodiment of the light detector 24 or the signal. The light detector 24 may be any detector which measures an intensity of light known to one having ordinary skill in the art, and the signal may be any means of indicating the light intensity detected known to one having ordinary skill in the art.

The light detector 24 may read and/or may measure an intensity of light reflected by the pressurized vessel 100 into the portable device 20. An amount of the light detected by the light detector 24 may correspond to and/or may be based on the volume of the pressurized vessel 100. The first lens 31 and/or the second lens 32 may focus the light entering the portable device 20 onto the light detector 24.

As shown in FIG. 1, the light detector 24 may be located between the LED 22 and the second lens 32. As a result, the light detector 24 may prevent the light entering the portable device 20 from reaching the LED 22. As shown in FIG. 2, the light detector 24 may be mechanically connected to a member 30 which may extend from the platform 26. The LED 22 may be mechanically connected to the platform 26 in a position adjacent to the member 30. The first lens 31 and/or the second lens 32 may focus the light entering the portable device 20 onto the light detector 24 to prevent the light entering the portable device 20 from reaching the LED 22.

As shown in FIG. 5, the light detector 24 may be electrically connected to a microprocessor 50. In an embodiment, the microprocessor 50 may be a component of the portable device 20. For example, in an embodiment, the microprocessor 50 may be mechanically connected to the housing of the portable device 20. In another embodiment, an electrical connection (not shown) may extend from the housing 19 of the portable device 20 to transmit the signal to the microprocessor 50. In yet another embodiment, the portable device 20 may have a wireless transmitter 12 which may transmit the signal to the microprocessor 50 using a wireless connection. The light detector 24 may transmit the signal as a function of light intensity detected to the microprocessor 50, and/or the microprocessor 50 may process the signal to determine the volume of the pressurized vessel 100. The microprocessor 50 may be electrically connected to a display screen 51 which may display the light intensity and/or the volume. In an embodiment where the microprocessor 50 is mechanically connected to the portable device 20, the display screen 51 may be mechanically connected to the housing 19 of the portable device 20.

The portable device 20 may have a power source 123 which may be located within and/or may be connected to the housing 19. The power source 123 may be electrically connected to the LED 22 and/or the light detector 24. The power source 123 may provide power to the LED 22 and/or the light detector 24.

Referring again to FIG. 4, the portable device 20 and/or the microprocessor 50 may continuously monitor the volume of the pressurized vessel 100, and/or the portable device 20 may continuously transmit the signal indicative of the volume of the pressurized vessel 100 to the microprocessor 50. As a result, the portable device 20 may enable real-time monitoring of the volume of the pressurized vessel 100 and/or the quantity of the contents of the pressurized vessel 100. The portable device 20 may continuously monitor the volume of the pressurized vessel 100 while the pressurized vessel 100 has contents and/or while the contents of the pressurized vessel are being used. If the volume of the pressurized vessel 100 and/or the quantity of the contents fall below or exceed a predetermined minimum value or a predetermined maximum value, respectively, the microprocessor 50 may automatically generate a response, such as, for example, an email alert, a text message alert, a pre-recorded voicemail and/or the like. In an embodiment, the response may recommend that an order be placed for the contents of the pressurized vessel 100 so that the volume of the pressurized vessel 100 and/or the quantity of the contents of the pressurized vessel 100 may be restored to the threshold value.

Gas may be introduced into the pressurized vessel 100 to test whether the pressurized vessel 100 has leaks and/or flaws. For example, the pressurized vessel 100 may be made from a material which regains its original shape after being deformed by a force. More specifically, the pressurized vessel 100 may be a Hookean vessel as known to one having ordinary skill in the art. The present invention is not limited to a specific embodiment of the material of the pressurized vessel 100, and the pressurized vessel 100 may be made of any material.

The portable device 20 may continuously monitor the volume of the pressurized vessel 100 while the gas is introduced, and/or the portable device 20 may continuously transmit the signal indicative of the volume of the pressurized vessel 100 to the microprocessor 50 as the gas is introduced. If the gas increases the volume of the pressurized vessel 100 beyond a predetermined threshold, such as, for example, 10% of the resting state volume, the portable device 20 and/or a user of the portable device 20 may determine that the pressurized vessel 100 has leaks and/or flaws.

In an embodiment, the shaft 45 may be a cylindrical rod. The shaft 45 may be any shape. The shape of the shaft 45 may be selected to enable the shaft 45 to be introduced into the pressurized vessel 100, such as, for example, through an inlet 101 of the pressurized vessel 100. For example, the shaft 45 may be reversibly removable from the portable device 20 such that the shaft 45 may be removed and replaced with a shaft having a different shape and/or a different size. Moreover, additional pressurized vessels (not shown) may have inlets of different sizes and/or different shapes relative to the inlet 101 of the pressurized vessel 100 and/or the inlets of the other additional pressurized vessels. The shaft 45 may be replaced with an additional shaft (not shown), and the additional shaft of solid optic material may have a size and/or a shape compatible with the inlet. As a result, the portable device 20 may be used for pressurized vessels having inlets of different sizes and/or different shapes.

As shown in FIGS. 6A, 6B and 6C, the portable device 20 and/or the microprocessor 50 may continuously monitor the volume of a bag 150 which may contain gas and/or fluid 155. The bag 150 may be located in a container 151. The bag 150 and/or a portion of the bag 150 may extend into the container 151. For example, the bag 150 and/or the container 151 may form an accumulator which may hold a non-compressible hydraulic fluid and/or a compressed gas. As another example, the bag 150 and/or the container 151 may form a wellhead for use with oil, natural gas and/or the like. As yet another example, the bag 150 may contain fluid used for intravenous delivery in a medical environment. The present invention is not limited to a specific embodiment of the bag 150 or the container 151.

The portable device 20, the shaft 45, the LED 22 and/or the light detector 24 may be located in the container 151 and/or outside of the bag 150. An intensity of the light detected by the light detector 24 may correspond to and/or may be based on the volume of the bag 150. The light detector 24 may continuously transmit the signal indicative of the volume of the bag 150 to the microprocessor 50. As a result, the LED 22 and/or the light detector 24 may enable real-time monitoring of the volume of the bag 150 and/or the quantity of the contents of the bag 150. If the volume of the bag 150 falls below or exceeds a predetermined minimum value or a predetermined maximum value, respectively, the microprocessor 50 may automatically generate a response, such as, for example, an email alert, a text message alert, a pre-recorded voicemail and/or the like.

For example, as shown in FIG. 6A, the bag 150 may contain an amount of the gas and/or fluid 155. Removal of a portion of the gas and/or the fluid 155 may decrease the volume of the bag 150 as shown in FIG. 6B. Decreasing the volume of the bag 150 may decrease the intensity of the light reflected by the container 151 and/or the exterior of the bag 150 and/or conveyed into the portable device 20. The intensity of the light detected by the light detector 24 may correspond to and/or may be based on the volume of the bag 150. As another example, increasing the amount of the gas and/or fluid 155 may increase the volume of the bag 150 as shown in FIG. 6C. Increasing the volume of the bag 150 may increase the intensity of the light reflected by the container 151 and/or the exterior of the bag 150 and/or conveyed into the portable device 20. The intensity of the light detected by the light detector 24 may correspond to and/or may be based on the volume of the bag 150.

An additional amount of the gas and/or fluid 155 may be introduced into the bag 150 to test whether the bag 150 has leaks and/or flaws. The portable device 20 and/or the microprocessor 50 may continuously monitor the volume of the bag 150 while the additional amount of the gas and/or fluid 155 is introduced. The portable device 20 and/or the light detector 24 may continuously transmit the signal indicative of the volume of the bag 150 to the microprocessor 50 as the additional amount of the gas and/or fluid 155 is introduced. If the additional amount of the gas and/or fluid 155 increases the volume of the bag 150 beyond a predetermined threshold, such as, for example, 10% of the resting state volume, the portable device 20 and/or the microprocessor 50 may determine that the bag 150 has leaks and/or flaws.

In an embodiment generally illustrated in FIG. 7, the LED 22 may be used to emit light into the interior of the bag 150. The portable device 20, the shaft 45, the LED 22 and/or the light detector 24 may be located in and/or connected to the interior of the bag 150. The intensity of the light detected by the light detector 24 may correspond to and/or may be based on the volume of the bag 150. The light detector 24 may continuously transmit the signal indicative of the volume of the bag 150 to the microprocessor 50. As a result, the LED 22 and/or the light detector 24 may enable real-time monitoring of the volume of the bag 150 and/or the quantity of the contents of the bag 150. If the volume of the bag 150 falls below or exceeds a predetermined minimum value or a predetermined maximum value, respectively, the microprocessor 50 may automatically generate a response, such as, for example, an email alert, a text message alert, a pre-recorded voicemail and/or the like.

An additional amount of the gas and/or fluid 155 may be introduced into the bag 150 to test whether the bag 150 has leaks and/or flaws. The portable device 20 and/or the microprocessor 50 may continuously monitor the volume of the bag 150 while the additional amount of the gas and/or fluid 155 is introduced. The portable device 20 and/or the light detector 24 may continuously transmit the signal indicative of the volume of the bag 150 to the microprocessor 50 as the additional amount of the gas and/or fluid 155 is introduced. If the additional amount of the gas and/or fluid 155 increases the volume of the bag 150 beyond a predetermined threshold, such as, for example, 10% of the resting state volume, the portable device 20 and/or the microprocessor 50 may determine that the bag 150 has leaks and/or flaws.

In an embodiment, a first portable device 20 and/or a first LED 22 may be located outside of the bag 150 and/or emit light into the container 151, and/or a second portable device 20 and/or a second LED 24 may emit light into the bag 150. A first light detector 24 may detect the intensity of the light reflected by the container 151 and/or the exterior of the bag 150, and a second light detector 24 may detect the intensity of the light reflected by the interior of the bag 151. The microprocessor 50 may determine the volume of the bag 150 using the intensity of the light reflected by the container 151 and/or the exterior of the bag 150 and/or the intensity of the light reflected by the interior of the bag 151.

In another embodiment, the LED 22, the light detector 24 and/or the microprocessor 50 may be used to determine the volume of the bag 151 without using the portable device 20 and/or the housing 19 of the portable device 19. For example, the LED 22 and/or the light detector 24 may be mechanically connected to the container 151. As another example, the LED 22 and/or the light detector 24 may be mechanically connected to the bag 150.

In yet another embodiment, the portable device 20, the shaft 45, the LED 22 and/or the light detector 24 may be used to determine the volume of a compartment, a position of a movable element within the compartment and/or a velocity of a movable element within the compartment as disclosed in U.S. Pat. Nos. 7,703,279; 7,518,100; 7,476,842; 7,468,522; 7,456,385; 7,388,188; 7,348,542; 7,291,830; 7,180,053; and 6,952,009, incorporated by reference in their entireties.

As shown in FIGS. 1, 2 and 5, the portable device 20 may have an additional light detector 124 which may be, for example, a light intensity detector, a photodiode, a phototransistor and/or other like detector that may output a current and/or a voltage as a function of light intensity detected. The additional light detector 124 may read and/or may measure an intensity of light emitted from the LED 22. Ambient light and/or the light entering the portable device 20 may be prevented from reaching the additional light detector 124 as disclosed in U.S. Pat. No. 7,626,153 and U.S. Ser. No. 12/807,531, incorporated by reference in their entireties. The present invention is not limited to a specific embodiment of the additional light detector 124, and the additional light detector 124 may be any detector for reading and/or measuring light intensity as known to one having ordinary skill in the art.

The additional light detector 124 may be electrically connected to a control circuit 122 with a first electrical connection 8. The control circuit 122 may be electrically connected to the LED 22 with a second electrical connection 10. The platform 26 may provide the first electrical connection 8 and/or the second electrical connection 10 for the additional light detector 124 and/or the LED 22, respectively. The first electrical connection 8 and/or the second electrical connection 10 may be any electrically conductive, connection, such as, for example, one or more wires, leads, solder joints and/or the like. The present invention is not limited to a specific embodiment of the electrical connection 8 or the electrical connection 10.

The control circuit 122 may be electrically connected to the power source 123, such as, for example, a battery, an electrical grid and/or the like. The control circuit 122 and/or the power source 123 may provide power to the LED 22, the detector 24 and/or the additional light detector 124. The control circuit 122 may be, for example, an analog circuit, a digital circuit and/or the like. The present invention is not limited to a specific embodiment of the control circuit 122, and the control circuit 122 may be any control circuit for measuring light intensity and/or regulating voltage and/or current applied to an LED as known to one having ordinary skill in the art.

The control circuit 122 may determine an intensity of light emitted from the LED 22 by monitoring a voltage and/or a current produced by the additional light detector 124 in response to an absorption of light by the additional light detector 124. The control circuit 122 may instantaneously change a voltage and/or a current applied to the LED 22 to regulate the intensity of the light emitted from the LED 22. The control circuit 122 may be used to regulate the intensity of light emitted from the LED 22 to be substantially uniform and/or stable over a period of time.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A portable device for measuring a volume of a vessel, the portable device comprising:
    a housing having a first end and a second end wherein the second end is located in a position opposite to the first end;
    an LED that emits light wherein the LED is located within the housing at the second end of the housing;
    a shaft extending from the first end of the housing wherein the shaft has a first end located outside of the housing and a second end located inside of the housing and further wherein the shaft is made of a material which conveys the light emitted from the LED from a position within the housing to a position outside of the housing wherein the shaft conveys reflected light into the housing;
    a first light detector located within the housing at the second end of the housing;
    a first lens located within the housing between the first light detector and the second end of the shaft wherein the first lens focuses the light emitted from the LED onto the second end of the shaft and further wherein the first lens focuses the reflected light conveyed by the shaft onto the first light detector wherein the first light detector measures an intensity of the reflected light conveyed by the shaft; and
    a microprocessor which receives a signal from the first light detector indicative of the intensity of the reflected light wherein the microprocessor uses the signal to determine the volume of the vessel.

2. The portable device of claim 1 further comprising:
    a second lens located within the housing between the first lens and the LED.

3. The portable device of claim 1 further comprising:
    a second light detector located within the housing at a position adjacent to the LED wherein the second light detector measures an intensity of the light emitted from the LED.

4. The portable device of claim 1 wherein the shaft has a cylindrical shape.

5. The portable device of claim 1 wherein the first lens is a ball lens having a spherical shape.

6. The portable device of claim 1 further comprising:
    a cylinder located between the first lens and the first end of the housing wherein the cylinder maintains a position of the first lens relative to the housing.

7. The portable device of claim 1 further comprising:
    a display screen mechanically connected to the portable device wherein the display screen displays at least one of the reflected light conveyed by the shaft and the volume of the vessel.

8. The portable device of claim 1 further comprising:
    a platform located at the second end of the housing wherein the LED is connected to the platform, and the first light detector is connected to a member which extends from the platform.

9. The portable device of claim 1 wherein the first light detector is located between the LED and the first lens.

10. The portable device of claim 1 wherein the microprocessor is mechanically connected to the housing.

11. A system for measuring a volume of a vessel having an interior, the system comprising:
    a portable device;
    an LED that emits light wherein the LED is located within the portable device;
    a shaft extending from the portable device wherein the shaft has a first end located outside of the portable device and a second end located within the portable device and further wherein the first end of the shaft inserts into the vessel to convey the light emitted from the LED into the vessel wherein the shaft conveys the light reflected by the interior of the vessel into the portable device; and
    a light detector located within the portable device wherein the first light detector is located between the shaft and the LED and further wherein the first light detector measures an intensity of the light reflected by the interior of the vessel into the portable device.

12. The system of claim 11 further comprising:
    a lens which focuses the light emitted from the LED onto the first end of the shaft wherein the lens focuses the light reflected by the vessel into the portable device onto the light detector and further wherein the lens is located between the light detector and the first end of the shaft.

13. The system of claim 11 further comprising:
    a wireless transmitter connected to the portable device wherein the wireless transmitter transmits a signal from the light detector to a microprocessor located remote from the portable device and further wherein the signal is indicative of the intensity of the light reflected by the vessel into the portable device wherein the microprocessor uses the signal to determine the volume of the vessel.

14. The system of claim 11 wherein the shaft is made of one of plastic and glass.

15. A method for measuring the volume of a vessel, the method comprising the steps of:
    emitting light from an LED into a container in which a vessel is located wherein the LED is located outside of the vessel and further wherein the vessel has an interior and an exterior;

obtaining measurements of an intensity of the light emitted from the LED into the container and reflected by at least one of the container and the exterior of the vessel;

transmitting a signal indicative of the measurements to a microprocessor; and determining the volume of the vessel wherein the microprocessor uses the signal to determine the measurements.

16. The method of claim 15 further comprising the step of:

introducing one of a gas and a fluid into the vessel wherein the measurements are continuously obtained during introduction of the one of the gas and the fluid into the vessel.

17. The method of claim 15 further comprising the step of:

focusing the light emitted from the LED into the container wherein a lens located between the LED and the container focuses the light.

18. The method of claim 15 further comprising the step of:

generating a response message if the volume of the vessel matches a predetermined threshold value wherein the microprocessor generates the response message.

19. The method of claim 15 further comprising the step of:

conveying the light emitted from the LED into the container wherein the light is conveyed by a shaft extending from a portable device which houses the LED and further wherein the shaft conveys the light reflected by at least one of the container and the exterior of the vessel into the portable device wherein a light detector located within the portable device obtains the measurements.

* * * * *